(12) United States Patent
Dorn et al.

(10) Patent No.: US 8,549,535 B2
(45) Date of Patent: Oct. 1, 2013

(54) DISTRIBUTED TASKFLOW ARCHITECTURE

(75) Inventors: Karlheinz Dorn, Kalchreuth (DE);
Hans-Martin Von Stockhausen, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 1181 days.

(21) Appl. No.: 11/976,805

(22) Filed: Oct. 29, 2007

(65) Prior Publication Data
US 2008/0141250 A1 Jun. 12, 2008

(30) Foreign Application Priority Data

Oct. 30, 2006 (DE) .......................... 10 2006 051 187

(51) Int. Cl.
*G06F 9/46* (2006.01)
(52) U.S. Cl.
USPC ............................ 718/106; 713/400; 713/401
(58) Field of Classification Search
None
See application file for complete search history.

(56) References Cited

U.S. PATENT DOCUMENTS

| | | | |
|---|---|---|---|
| 4,394,730 A * | 7/1983 | Suzuki et al. ................. | 718/103 |
| 5,805,823 A * | 9/1998 | Seitz ............................. | 709/236 |
| 2002/0085026 A1 * | 7/2002 | Bocionek et al. ............. | 345/738 |
| 2003/0037107 A1 * | 2/2003 | Maeda .......................... | 709/203 |
| 2003/0233404 A1 * | 12/2003 | Hopkins ....................... | 709/203 |
| 2004/0078373 A1 * | 4/2004 | Ghoneimy et al. ............ | 707/10 |
| 2005/0044165 A1 * | 2/2005 | O'Farrell et al. ............. | 709/213 |
| 2005/0187948 A1 * | 8/2005 | Monitzer et al. .............. | 707/100 |
| 2007/0162260 A1 * | 7/2007 | Nordstrom .................... | 702/186 |

* cited by examiner

*Primary Examiner* — Emerson Puente
*Assistant Examiner* — Sisley Kim
(74) *Attorney, Agent, or Firm* — Harness, Dickey & Pierce, P.L.C.

(57) ABSTRACT

A method, a system and a product are disclosed for executing a taskflow in a distributed taskflow architecture and for providing the latter. In at least one embodiment, the taskflow is generated by interconnecting modular tasks, having a synchronization mechanism in order to be able to execute the taskflow on different processing instances both in an online mode and in an offline mode and in order to allow a change between the modes even during performance of the taskflow.

17 Claims, 4 Drawing Sheets

DISTRIBUTED TASKFLOW ARCHITECTURE

PRIORITY STATEMENT

The present application hereby claims priority under 35 U.S.C. §119 on German patent application number DE 10 2006 051 187.5 filed Oct. 30, 2006, the entire contents of which is hereby incorporated herein by reference.

FIELD

Embodiments of the invention are generally in the field of computer architecture or system design for a system for processing medical image data and may relate particularly to a method, a system and/or a product for providing a distributed taskflow architecture, with the taskflow being generated by dynamically interconnecting a multiplicity of modular tasks.

BACKGROUND

In modern systems used today in the field of medical data processing, provision is made for the captured data to be in digital form and accordingly also to be processed further in digital form using electronic appliances. The wide variety of different processing processes in the clinical environment means that there is a large number of different taskflows for performing particular activities. One example which may be mentioned here are taskflows which are required for image data capture, for post-processing the captured image data, and taskflows which are required for archiving image data. A taskflow usually requires a sequence of predefined method steps and input data in order to be able to perform the relevant tasks or activities. The data are usually medical data, such as particularly image data, patient-related data records or text data which are required for an examination or a report. A taskflow is executed on any desired computer network or a portion thereof and is equipped with interfaces in order to allow data interchange with external systems. The input and output data are usually provided by what is known as an RIS system. There is a further interface to PACS systems (PACS: Picture Archiving Communication System).

In the medical or clinical field of use, there are a large number of requirements which make a system architecture relatively complex. On the one hand, there are a large number of central processing stations which are equipped with high processor power and high memory requirements in order to execute complex processing steps, such as post-processing processes. On the other hand, it is also meant to be possible to be able to operate and to use clients within the system, which, by way of example, comprise small handhelds or other small appliances, such as PDAs, and are available to the doctor, e.g. in the course for a visit. The functionalities which are needed in the present example of a visit, such as the capture and storage of data recorded for the visit and, by way of example, access to medication data, are meant to be available on these appliances, inter alia. Furthermore, it is necessary for these data which have been captured by the appliance to be transmitted to the central system at a later time. In this context, it is necessary to ensure that the data are kept basically consistent in order to prevent different instances or versions of one and the same data record from existing in the system, which could result in sometimes serious consequent errors.

Furthermore, it should be possible for all appliances connected to the system to be able to be used at any time regardless of the network resources and therefore also to be able to be operated in an online mode and in an offline mode.

In the clinical field of use with different service times, there are normally a large number of people who undertake the execution and/or monitoring of a particular taskflow. Furthermore, it is possible for one and the same person to undertake and perform different tasks (e.g. the task of an examining doctor and the task of a scheduler for future examinations). Thus, it is necessary to be able to adapt the architecture of the system very flexibly to the different processing instances, to the respective users of the processing instances and/or to the respective applications of the users. Furthermore, a change of role needs to be supported, i.e. different users simultaneously handle portions of the same taskflow with the option of interrupting the flow and continuing it on another computer.

In previous systems known from the prior art, there are no opportunities to generate a taskflow dynamically. The configuration options for particular activities were therefore very restricted. By way of example, it was always necessary to perform a first activity, particularly a selection functionality, before further tasks could be undertaken. Furthermore, the final activity to be performed in a taskflow always had to be a data transfer, that is to say that the data processed by way of the taskflow had to be forwarded to another instance. This meant that the basic flow of a taskflow was unnecessarily very restricted.

Disadvantageously, the opportunities to provide online processing and offline processing at particular processing stations were likewise very restricted. Particular processing stations or processing instances were equipped with online access, while other instances had no access to the network. These provisions were normally rigid. It is therefore desirable to have a system architecture which allows a further degree of flexibilization by virtue of one and the same processing instance being able to be operated in different modes of operation, particularly in an online mode or in an offline mode. A change between the aforementioned modes shall also be supported without inconsistencies or even the loss of data arising.

Since the applications are frequently relatively complex tasks, it may be necessary in certain situations to interrupt a processing process. Interruption of a processing process and resumption possibly taking place at a later time were not possible in the previous systems from the prior art. It is therefore desirable to have a system architecture which allows further flexibilization for the execution of a processing process by virtue of the processing process being able to be interrupted and possibly resumed at a later time. In this context, further flexibility should involve the processing process being able to be started on a free choice of processing instance and not necessarily having to be started on that instance on which the taskflow was interrupted.

SUMMARY

In at least one embodiment of the present invention, a way of providing an architecture for a complex data processing system is demonstrated, particularly for medical image data, which allows much more flexible use and more flexible application options and which can be designed to adapt to the respective application care.

Embodiments of the invention are described below for the solution based on the method. Features, advantages and alternative embodiments mentioned in this context can likewise be transferred to the other solutions, particularly to the article-based solution by the system, and to the product. It is therefore also possible to develop the system and the product using the features which have been described in connection with the method.

A method is disclosed, in at least one embodiment, for providing a distributed taskflow architecture having a plurality of different processing instances, where the taskflow is generated by dynamically interconnecting a multiplicity of modular tasks, with data to be processed always being kept consistent by a synchronization mechanism, where the synchronization mechanism allows simultaneous access to the data, possibly by different processing instances, and where the generated taskflow can be interrupted on a processing instance at a determinable time and can be resumed on a determinable processing instance at a later time, and where the taskflow can be executed in an online mode and/or in an offline mode, and where it is also possible to change from one mode to another mode even during performance of a taskflow.

Fundamental advantages can be considered to be a significant improvement in performance, increased flexibility, adaptability to different processing instances or workstations and applications, and expandability and interchangeability of individual modules of the taskflows in order to adapt to the respective customer needs.

A taskflow is therefore defined by the interconnection of different activities, applications and tasks which can arise in a taskflow, possibly also multiple times. A task is synonymous with an application or a technical modular entity or job.

A processing instance is an application computer with different technical resources and options, such as a PDA, a laptop, a central server etc.

In an example embodiment, the inventive framework is based on a client-server architecture, comprising three layers. In alternative embodiments, however, n-layered systems may likewise be used. In the preferred embodiment, cache support is provided, at least on the part of the client. This makes it possible to provide lists of activities, known as inbound queues and outbound queues. Instead of starting a workflow or a taskflow—as previously—with a fixed predefined activity, at least one embodiment of the invention provides a further degree of freedom in which a variable start is possible in this case, an inbound queue being provided which contains the input data for freely definable workflow steps which need to be executed by the taskflow. The same applies to the termination of a taskflow. At this point, too, it is possible to achieve a further degree of freedom by virtue of the end of a taskflow not being limited to one particular activity, but rather accordingly, in this case too, an outbound queue being provided which comprises a sequence of possible activities which need to be performed in order to terminate a taskflow, the sequence comprising a plurality of method steps. Examples which may be mentioned of the activities are tasks which relate to the results or a presentation of the data, which relate to preferred reports or which include forwarding of the data.

In an example embodiment, the data format of the inbound and outbound queues is not stipulated but rather is freely configurable. Preferably, it is an XML data format and/or data based on the DICOM standard. The data structure for the inbound and outbound queues is also not stipulated but rather is configurable. In the simplest case, it is a simple directory within a directory system. The directory structure is usually hierarchic and, in a functional respect, is used to select particular activities to be performed and their sequences which, by way of example, relate to a suitable taskflow or a pattern therefor, input presentation statuses, referenced reports or referenced image headers. In other words, the inbound queue is a jointly used data pool (shared data pool) for input data, and the outbound queue is a pool of this kind for output data.

Usually, the inventive modules and particularly also the queues are equipped with appropriate interfaces in order to allow data interchange with external instances and applications.

As already mentioned above, the output queue is also used to store DICOM jobs performed by the taskflow in conclusion. The outbound queue is written by the relevant taskflow template and can be forwarded—possibly with a configurable time delay—to other nodes, or it can be synchronized with an internal server queue.

Since at least one embodiment of the inventive method supports an online mode and an offline mode and a change between the aforementioned modes, provision is made for both the inbound queue and the outbound queue to be synchronized. This is particularly relevant for a change between the modes. It is therefore possible to read in activities to be performed in an online mode, then to change to the offline mode (by breaking the network connections, for example) and to perform the activities in the offline mode.

When the activities have been performed, it is then possible to change back to the online mode. This allows the flexibility of the system to be increased by allowing particular workflows to be executed even when the system is in the offline mode. Furthermore, the data captured and/or stored in the offline mode are synchronized for operation of the respective other mode—in this case for the online mode—and are therefore available persistently. The flow described above related to the inbound queue. The same applies accordingly also to the output queue. In the case of the outbound queue, activities to be performed are collected in an offline mode. A change is then made to the online mode, in which the collected activities in the outbound queue are performed. It is then possible to change back to the online mode.

An example which can be cited for one application case is the scenario of a visit. In the online mode, the data which are relevant to the visit are loaded onto a handheld or other pocket PC appliance, a PDA or a laptop or the like. A change is then made to the offline mode. By accessing the respective data, it is then possible to make the visit with the appliance. During the visit, the data are available for different taskflows. Equally, it is possible to capture further data here (e.g. data relating to the state of the respective patient). These data are captured and stored in the offline mode. Upon subsequently changing from the offline mode to the online mode, the freshly captured data are automatically installed in the system, so that at any time the consistency of the data is maintained and there is the assurance that the most up-to-date data are always being used. This is particularly relevant for applications running in parallel which at least to some extent access common data.

To be able to ensure that the data are consistent, at least one embodiment of the invention provides particular jointly used memory areas. The term "shared workspace" is used within the context of this invention as a synonym for these jointly used memory areas. The shared workspace is closely related to the inbound and outbound queues. The workspace is preferably a "mapped" cache area. The content of the workspace is formed from the XML sequence which has been "mapped" or allocated from the relevant queue. The content of the input queue may be what are known as PLC data records, input reports and referenced image data, for example, while the content of the output queue comprises what are known as PPC data, already generated images and generated or modified reports. The queue is therefore the start or the end of a taskflow to be executed. The queues take on the role of a persistent memory for the taskflows. Advantageously, it is therefore no longer absolutely necessary to use a database management system; a database is merely an optional feature. At least one embodiment of the inventive data management is file-based.

At least one embodiment of the inventive use of the shared workspace allows aspects relating to locking and to concurrency aspects for activities which access the same shared workspace to be resolved.

At least one embodiment of the inventive client-server architecture also allows thin clients or adaptive clients to be depicted. Adaptive clients are usually appliances which automatically identify the use environment and, in particular, automatically detect whether the appliance is being operated in an online mode or in an offline mode. The adaptivity therefore preferably relates to the network circumstances of the respective appliance. The appliances may be small electronic appliances with appropriate interfaces, such as PDAs, laptops, portable PCs or other pocket devices; more complex appliances, workstations or systems are equally conceivable here.

Today's systems require every processing instance to be managed locally by appropriate service personnel. However, this management has associated high costs. These costs can be significantly reduced by the inventive solution by virtue of what is known as a "zero administration" functionality being provided. This functionality is the feature that particular process steps, applications and taskflow instances can be installed on the client without any management complexity for the client.

At least one embodiment of the invention therefore allows the provision of installation scenarios or deployment scenarios which are executed by just one click (single click deployments). All the management or administration is effected on the server. This allows an enormous saving in management costs by virtue of all the management being able to be centralized. Furthermore, it is possible to install the individual applications and/or the taskflows on a plurality of processing instances and/or on a plurality of workplaces too through zero admin deployment based on at least one embodiment of the invention.

Another feature of at least one embodiment of the inventive solution concerns what is known as taskflow enabling. This feature relates to the possibility of generating different taskflows dynamically. Unlike previous systems from the prior art, the taskflows are now generated automatically. Hitherto, it was necessary for a user to define the flow interactively through appropriate selection of the respective tasks or task cards.

Chronologically successive user interactions (selection of particular tasks) have defined the taskflow to date. In line with the invention, this is now done automatically by providing a taskflow engine which automatically changes from one activity to the next and provides the respective input and output data. The taskflow is generated using a taskflow pattern (taskflow template) provided by the manufacturer or by the respective user. The taskflow template is an XML configuration file which is designed for the respective applications. In line with the invention, it is even possible to provide an interleaved taskflow, which comprises interleaved parent and dependent child taskflows.

In one advantageous development, the feature of automatic generation of the taskflow is provided as an optional feature, so that appropriate user inputs provide the user alternatively or cumulatively with the option of determining the flow of the taskflow. This is made possible by virtue of the user interface providing particular task cards and/or subtask cards which the user can activate by way of an appropriate click of the mouse.

The interconnection options for taskflows are subject to particular limitations. By way of example, a subsequent activity and a preceding activity can be interconnected only if the preceding activity delivers the appropriate output data needed as an input for the subsequent activity. If the subsequent activity still requires further input data, the subsequent activity still needs to be interconnected to a further preceding activity.

These checks for possible interconnections among the activities are performed automatically in line with at least one embodiment of the invention. They normally concern the input and output data for the respective activities. In alternative embodiments of the invention, however, it is likewise possible for yet further criteria to be taken into account here which restrict the interconnection of the respective activities. If a user wishes to use appropriate interaction on the user interface in order to generate a taskflow which comprises activities which cannot be interconnected, the invention provides for appropriate warning advice to appear on the user interface in order to advise the user of the incongruence of the relevant data records.

At least one embodiment of the inventive dynamic generation of a taskflow allows an identical user interface to be provided for the user, so that an identical look and feel are obtained for the user, even though different taskflows are being executed. This is advantageously possible without the need for any change in the underlying technique.

At least one embodiment of the inventive architecture is subdivided into the following subsystems:
  central infrastructure,
  central database management,
  central taskflow management,
  distributed image viewing taskflows, and
  distributed work item handling with taskflow activation.

At least one embodiment of the invention architecture is based on a check in/check out concept for short term storage (STS) of a data archiving system in a context folder for processing patient data within a taskflow. The context folder is usually a directory in the file system and part of the short term memory, which is coordinated with the long term memory, preferably cyclically. It comprises a respectively updated work version of the data which are copied to the laptop, for example, when an offline mode has been set. The results produced there can then be "checked in" again. Preferably, the filing of intermediate copies is optimized. The data in a context folder can be accessed both in the online mode and in the offline mode. It is therefore possible to be able to execute the taskflow for the respective data even without a network connection.

At least one embodiment of the inventive taskflow architecture is based on a multiplicity of possibly different processing instances. The processing instances may be general processing stations, input instances, workstations and/or a client or a server.

The taskflow generated in line with the invention is preferably generated automatically, interactively and/or dynamically. Usually, a task comprises at least one subtask.

At least one embodiment of the inventive synchronization mechanism allows the data to be kept persistent even when there is an interruption in the taskflow and/or when there is a change between the processing modes (online mode or offline mode). The data are therefore also available in the event of later resumption of the taskflow. This applies even when the taskflow is not resumed on the processing instance on which it has been interrupted, but rather on another processing instance. This increases the degree of flexibilization further.

A fundamental feature of at least one embodiment of the present invention can be considered to be access to the inbound and/or outbound queue(s) when the taskflow is performed, said queues being synchronized by the synchronization mechanism.

The synchronization mechanism supports at least one processing instance designed as an adaptive client being able to be operated in an online mode and/or in an offline mode and supports a change between these two modes being possible without any resultant data loss, the data being kept consistent.

Furthermore, the synchronization mechanism allows simultaneous access to data even by different processing instances. In this case, the data may even be in the same address space. The access may be read access, write access and/or change access.

Another feature of at least one embodiment of the inventive solution can be seen in the provision of an architecture comprising a large number of processing stations which can be integrated into the system in order to perform the taskflow. In this case, a "zero admin technique" is preferably supported.

Another way of achieving the object is a system for providing a distributed taskflow architecture having a plurality of processing instances, having:

an interconnection unit which is intended to generate the taskflow from modular tasks by dynamically interconnecting the tasks, a synchronization module which is intended to keep the data consistent, where the system supports simultaneous access to data by/from different processing instances and where the system allows the generated taskflow to be able to be interrupted on a processing instance at a definable time and to be resumed on a definable processing instance at a later time, and where the system allows the taskflow to be executed in an online mode or in an offline mode, and also allows a change from one mode to the respective other mode even during performance of the taskflow. In this case, the interconnection unit and the synchronization module may have been activated on different processing instances.

The inventive embodiments of the method which have been described above may also be in the form of a computer program product, with the computer being prompted to carry out the inventive method described above and its program code being executed by a processor.

One alternative provides a storage medium which is intended to store the computer-implemented method described above and which can be read by a computer.

Furthermore, it is possible for individual components of at least one embodiment of the method described above to be able to be executed in one saleable unit and for the remaining components to be able to be executed in another saleable unit—as a distributed system so to speak. Another way for at least one embodiment of the invention to achieve the object is therefore a product for a multiclient business architecture, where the product comprises devices/modules which are set up to carry out those steps of a method according to at least one of the method aspects described above which are prompted by the product, at least one further product being set out to carry out the remaining steps of the method, so that the interaction of the two products results in all the steps of the method being carried out.

Further advantageous embodiments can be found in the subclaims.

BRIEF DESCRIPTION OF THE DRAWINGS

The detailed description of the figures below discusses example embodiments, which are to be understood as being nonrestrictive, with their features and further advantages with reference to the drawings, in which.

DETAILED DESCRIPTION OF THE EXAMPLE EMBODIMENTS

Figure 1:
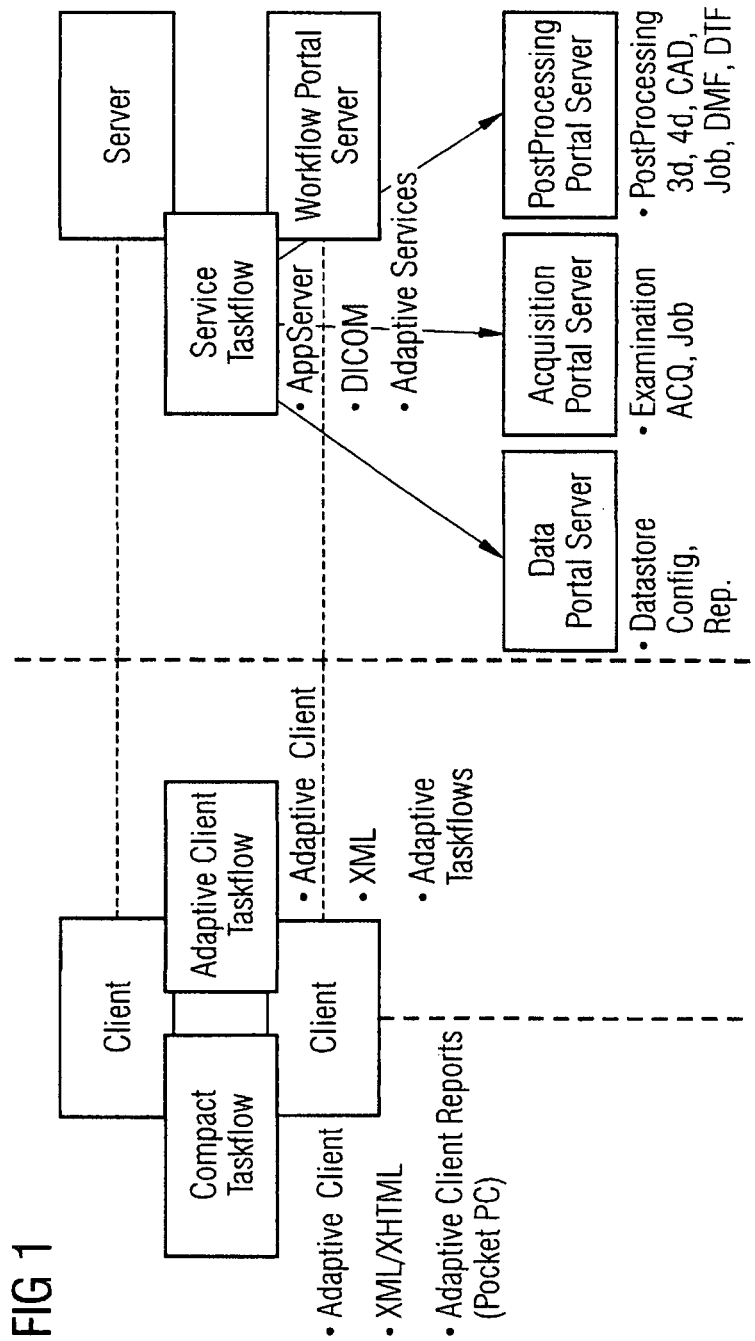
FIG. 1 shows an overview-type illustration of an inventive client-server taskflow architecture based on an example embodiment.

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the terms "and/or" and "at least one of" include any and all combinations of one or more of the associated listed items. Depending on the area of application, it is possible for the client to be in the form of an adaptive client or in the form of a fat client. In FIG. 1, the client is in the form of an adaptive client and is used for executing complex (compact) or simple (smart) taskflows, and processes data records in XML format or in XHTML format. It is likewise possible to provide less complex reports, known as smart reports, on a portable electronic appliance, e.g. a pocket PC. The right-hand side of FIG. 1 shows the underlying server architecture. Furthermore, what is known as a workflow portal server is accessed. In addition, the server comprises an application server which processes data in DICOM format and provides smart services. A data portal server is designed for data storage, an acquisition portal server is designed for examination, and a post-processing portal server is provided for post-processing the data. In alternative embodiments, however, other servers may also be used here. Normally, the data formats used are XML (usually on the adaptive client) and DICOM (usually on the server).

In the text below, an application is defined as a task which is demanded by particular inputs and outputs (which can also be referred to as ports in a technical respect). An activity can be used in a plurality of taskflows and therefore reused without the need to reprogram it afresh. Portions of applications, known as subapplications, can also be defined as subtasks and comprise tasks or steps. These can also be used in a plurality of different taskflows without the need for reprogramming. A taskflow comprises a large number of activities which are controlled by a taskflow engine and are generated in line with a taskflow pattern or taskflow template.

Alternatively, activities can also be controlled by way of user interaction, namely by way of the selection of a particular task card (task card stacking) instead of the taskflow engine. In this case, the taskflow template is merely responsible for specifying the order of activities in a container which are to be loaded into the card stack. An individual generic container controls an individual taskflow. A taskflow template is normally an XML file which defines an order of activities. Following execution of the respective activities in the defined order, the taskflow result is meant to be achieved in a functional respect.

A taskflow engine is a control functionality which executes taskflow templates by switching to and fro between the respective activities in a predefined order, the output data from a preceding activity being used as input data for a subsequent activity. The taskflow engine is deployed as an individual component and is "hosted" within the generic container.

A fundamental advantage of an embodiment of the inventive solution can be considered to be that the architectural layers can be distributed over the clients/servers in different ways, namely can be in the form of, by way of example:
  a thin client,
  a rich thin client,
  an adaptive client,
  a rich client and
  a fat client.

The respective components and modules are deployed (strategy and purpose of use) on a processing station without any management or administration complexity. This is what is known as "zero admin deployment".

Examples of activities in the field of cardiology and radiology are the following functions:
  Register,
  Perform-Scan,
  Thick-Slice-Recon,
  Thin-Slice-Recon and
  Send to archive.
Examples of tasks in this area are:
  Select Scan Protocol,
  Adjust Parameter,
  Run Topo etc.

Figure 2:
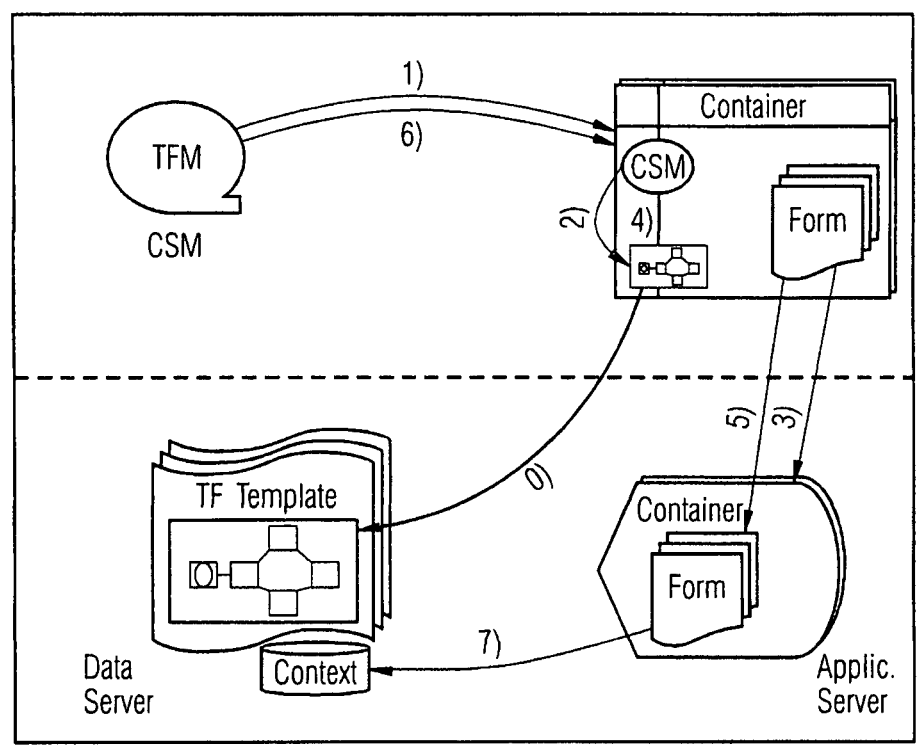
FIG. 2 shows a schematic illustration of a local taskflow with a task list, having a frontend-driven taskflow architecture.

FIG. 2 schematically shows a local taskflow which is controlled by a front end, in which the taskflow manager I (denoted by TFM in FIG. 2) starts a frontend container at the arrow identified by 1) in FIG. 2 (by producing a taskflow instance before the respective taskflow has been downloaded at the arrow identified by 0)), executes a taskflow pattern (template) at the arrow identified by 2), starts a form at the arrows identified by 3) and 4) and executes said form at the arrow identified by 5) in order to start, stop, resume and/or complete the taskflow instance at the arrow identified by 6) and in order then to store the respective status or state at the arrow identified by 7). The container, for its part, controls a taskflow engine and frontend activities and/or activates tasks accordingly. Each frontend activity or each frontend task is started in line with the requirements of the back end, while the back ends are not controlled by the taskflow manager.

Figure 3:
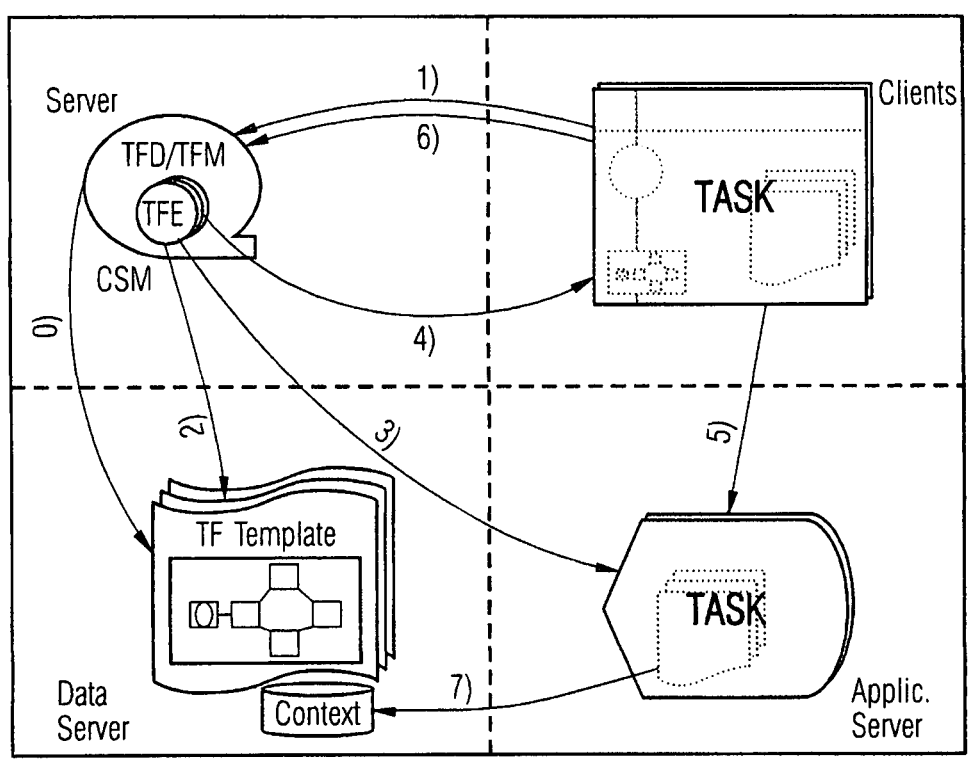
FIG. 3 shows a schematic illustration of a server-driven or backend-driven taskflow architecture.

FIG. 3 shows a central taskflow architecture with an application-specific task list which is controlled by the server or by the back end. In this case, the backend activities or the backend tasks are controlled by a central taskflow manager (which is likewise denoted by TFM in FIG. 3). This incorporates the features "taskflow enabling" and "taskflow-driven" (denoted by TFE/TFD in FIG. 3). The respective user interface for the activity or task is activated only when needed, since not every back end requires a front end. When a frontend is active, it communicates with the back end (vertical application architecture) several times until the back end decides that the taskflow step is complete and informs the taskflow manager accordingly. At the arrow identified by 0) in FIG. 3 a design for the taskflow is determined, at 1) a taskflow instance is produced, at 2) the taskflow template is executed, at 3) and 4) the task(s) is/are downloaded and started, and at 5) it is executed. The meaning of the arrows identified by 6) and 7) (and also the others unless stated otherwise) corresponds to that of the arrows in FIG. 2.

Figure 4:
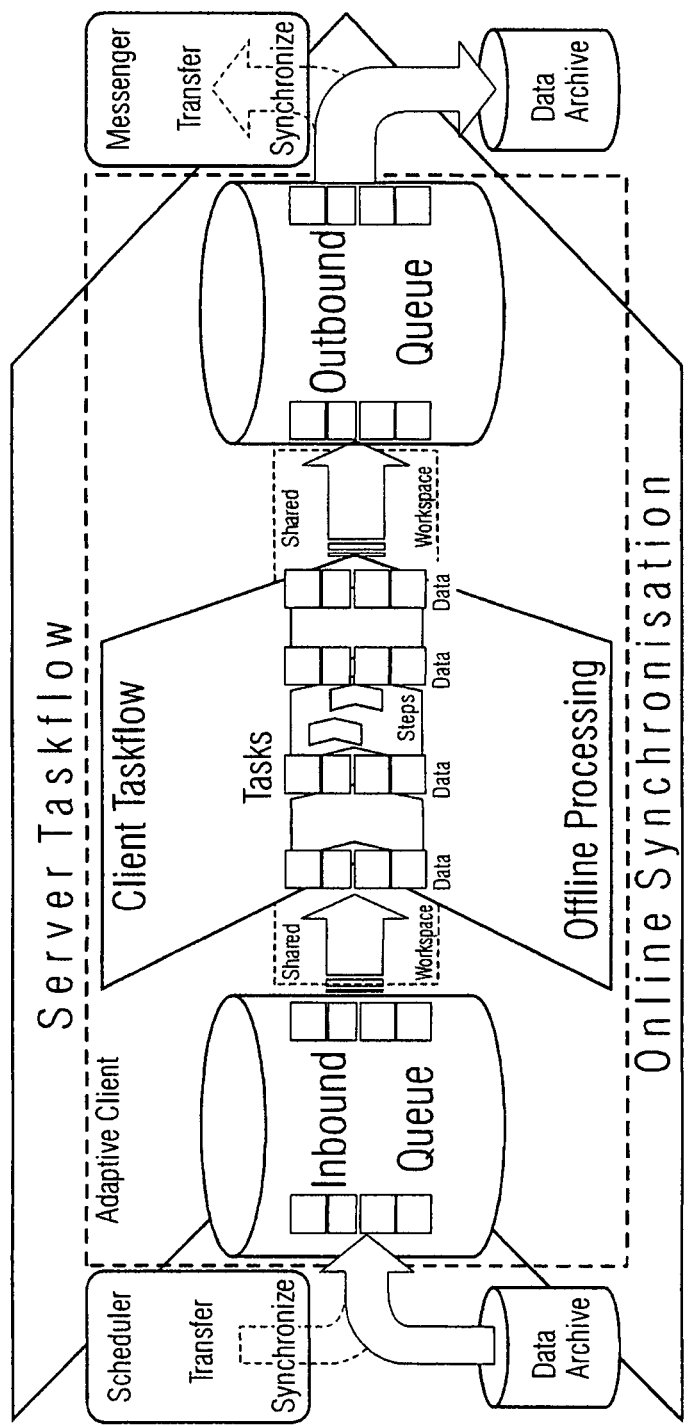
FIG. 4 shows a schematic illustration of different taskflow activities with an inbound queue and an outbound queue and synchronization between an offline mode and an online mode via a data archive.

FIG. 4 schematically shows an embodiment of an inventive synchronization mechanism for a server taskflow with inventive online synchronization. In this case, data are read into an inbound queue from a data archive, and the inbound queue is used as a common data pool for a shared workspace on which the steps or the processing steps/the tasks are executed. By way of example, the following may be cited as requested jobs for the inbound queue: PLC, REPORT, PPC etc. These activities are shown in FIG. 4 by way of the square boxes within a task, or within a client taskflow. By accessing the shared workspace, the processed data are in turn supplied to an outbound queue. From the outbound queue, the data are forwarded to the archive for storage.

Both when reading in from the archive and when storing in the archive, synchronization takes place, so that it is ensured that the data records are always kept consistent. As indicated in FIG. 4, it is possible for the activities—that is to say the actual data processing—to be performed in an offline mode (offline processing), while the archive is accessed in an online mode. This naturally also applies the other way round as appropriate.

A central strategy manager, also referred to as CSM, controls the overall taskflow and defines data transfers between the modular tasks and the respective interfaces. In this context, it is possible to set, inter alia, that a task as a resource is to be only singularly executable, so that other instances have to wait until the task has been fully executed and is free again, for example. The central strategy manager also controls what tasks of the taskflow are executed in parallel—that is to say simultaneously—on different processing instances.

In conclusion, it should be pointed out that the above description of embodiments of the invention and the illustrated example embodiments are, in principle, to be understood as being nonrestrictive in respect of a particular physical implementation of the invention and can therefore also be modified in a wide variety of ways without departing from the scope of the invention. In particular, it is obvious to a person skilled in the art that embodiments of the invention can also be implemented as a heterogeneous system, in part or fully by software and/or hardware modules and/or in a manner distributed over a plurality of physical products—in this case including computer program products, in particular. Furthermore, it is possible to use the inventive solution as a module, particularly as a computer program module, in order to integrate it into existing systems.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for handling a taskflow with a plurality of distributed processing instances, comprising:
   installing a plurality of modular tasks on the plurality of distributed processing instances based on installation criteria stored on a server associated with the plurality of distributed processing instances;
   dynamically generating a taskflow, the taskflow including the plurality of modular tasks, by interconnecting selected the plurality of modular tasks, so that the taskflow is handlable on different processing instances in succession, the generated taskflow being interruptible at a definable time and being handlable again on a definable processing instance at a later time, the taskflow being associated with one or more medical tasks, wherein the generated taskflow uses a task flow template that is an XML configuration file and responsible for specifying an order of the plurality of modular tasks in the different processing instances, and each of the plurality of modular tasks are used in plurality of taskflows and reused without the need for reprogramming;
   displaying a warning advising of an incongruence of data records if the taskflow includes tasks that cannot be interconnected;
   accessing at least one of an inbound queue and an outbound queue; and
   synchronizing the at least one inbound queue and outbound queue upon performing the taskflow, wherein the at least one inbound queue being provided which contains a input data for workflow tasks which need to be executed by the taskflow, and the at least outbound queue being provided which includes a sequence of possible of the plurality of modular tasks which need to be performed in order to terminate the taskflow.

2. The method as claimed in claim 1, wherein at least individual tasks in the taskflow are as distributed jobs processed in parallel.

3. The method as claimed in claim 1, wherein the taskflow architecture is at least one of one-layered, two-layered and n-layered, comprising tasks, subtasks and tools.

4. The method as claimed in claim 1, wherein at least one of the one or more medical tasks include performing medical imaging tasks as determined by accessing medical imaging data.

5. The method as claimed in claim 1, wherein the generating of the taskflow is done at least one of automatically, interactively and dynamically.

6. The method as claimed in claim 1, wherein the data are kept persistent even if the taskflow is interrupted and is later resumed.

7. The method as claimed claim 1, wherein the method accesses a data archiving system in order to optimize buffer-storage operations for data within a taskflow.

8. The method as claimed in claim 1, wherein the data are kept on a server.

9. The method as claimed in claim 1, wherein at least one processing instance designed as an adaptive client is operable in at least one of an online mode and in an offline mode, and wherein it is possible to change between these modes while the data are kept consistent.

10. The method as claimed in claim 1, wherein at least portions of the taskflow are executable on a processing instance which is in the form of an adaptive client, the adaptive client supporting a simple deployment strategy.

11. The method as claimed in claim 1, wherein the method is settable to execute the taskflow in at least one of an online mode and an offline mode, and to change from one mode to the respective other mode even during performance of the taskflow.

12. The method as claimed claim 1, wherein the method accesses a data archiving system in order to improve buffer-storage operations for data within a taskflow.

13. The method as claimed in claim 11, wherein the method is settable at runtime to execute the taskflow.

14. The method as claimed in claim 1, wherein the processing instance is configured to process data in DICOM (Digital Imaging and Communications in Medicine) format.

15. The method as claimed in claim 1, wherein an identical user interface is generated for different task flows having an identical look and feel for a user.

16. A system for providing a distributed taskflow architecture having a plurality of processing instances, comprising:
- an installation unit to install modular tasks on the plurality of distributed processing instances based on installation criteria stored on a server associated with the plurality of distributed processing instances;
- an interconnection unit to dynamically generate the taskflow from the modular tasks by dynamically interconnecting the modular tasks, each of the modular tasks being associated with one or more medical tasks, wherein the generated taskflow uses a task flow template that is an XML configuration file and responsible for specifying an order of the plurality of modular tasks in the different processing instances, and each of the plurality of modular tasks are used in plurality of taskflows and reused without the need for reprogramming;
- a display to advise of an incongruence of data records if the taskflow includes tasks that cannot be interconnected;
- a synchronization module to keep the data consistent, wherein the synchronization module supports simultaneous access to data by/from different processing instances and wherein the synchronization module allows the generated taskflow to be able to be interrupted on a processing instance at a definable time and to be resumed on a definable processing instance at a later time, and wherein the synchronization module allows the taskflow to be executed in at least one of an online mode and an offline mode, and also allows a change from one mode to the respective other mode even during performance of the taskflow; and
- at least one of an inbound queue and an outbound queue the at least one inbound queue and outbound queue configured to synchronize upon performing the taskflow, wherein the at least one inbound queue being provided which contains a input data for workflow tasks which need to be executed by the taskflow, and the at least outbound queue being provided which includes a sequence of possible of the plurality of modular tasks which need to be performed in order to terminate the taskflow.

17. A non-transitory computer readable medium including program segments for, when executed on a computer device, causing the computer device to implement the method of claim 1.

* * * * *